(12) United States Patent
Zhao et al.

(10) Patent No.: US 11,143,150 B2
(45) Date of Patent: Oct. 12, 2021

(54) SELF-REGULATING VENTS FOR VEHICLES

(71) Applicant: Nissan North America, Inc., Franklin, TN (US)

(72) Inventors: Nanzhu Zhao, Farmington Hills, MI (US); Nilesh Dale, Novi, MI (US); Takafumi Fukumoto, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 182 days.

(21) Appl. No.: 16/450,075

(22) Filed: Jun. 24, 2019

(65) Prior Publication Data

US 2020/0400110 A1    Dec. 24, 2020

(51) Int. Cl.

| | | |
|---|---|---|
| *F02M 35/10* | (2006.01) | |
| *B62D 25/12* | (2006.01) | |
| *B62D 25/10* | (2006.01) | |
| *B60K 11/08* | (2006.01) | |
| *F16K 31/00* | (2006.01) | |
| *F03G 7/06* | (2006.01) | |

(52) U.S. Cl.
CPC ..... *F02M 35/10242* (2013.01); *B60K 11/085* (2013.01); *B62D 25/105* (2013.01); *B62D 25/12* (2013.01); *F02M 35/10209* (2013.01); *F03G 7/065* (2013.01); *F16K 31/002* (2013.01)

(58) Field of Classification Search
CPC ....... F02M 35/10242; F02M 35/10209; B62D 25/12; B62D 25/105; F16K 31/002; F03G 7/065; B60K 11/085
See application file for complete search history.

(56) References Cited

U.S. PATENT DOCUMENTS

| | | | |
|---|---|---|---|
| 7,498,926 B2 * | 3/2009 | Browne | ............... B60K 11/085 123/41.06 |
| 7,517,279 B2 | 4/2009 | Kober et al. | |
| 9,346,345 B2 | 5/2016 | Alexander et al. | |
| 2019/0030988 A1 | 1/2019 | MacLean et al. | |

FOREIGN PATENT DOCUMENTS

| | | |
|---|---|---|
| DE | 10303114 B3 | 8/2004 |
| DE | 202018104381 U1 | 8/2018 |

* cited by examiner

*Primary Examiner* — D Glenn Dayoan
*Assistant Examiner* — Melissa Ann Bonifazi
(74) *Attorney, Agent, or Firm* — Young Basile Hanlon & MacFarlane, P.C.

(57) ABSTRACT

A vehicle is disclosed that includes a hood defining at least one opening, and a vent that is positioned within the at least one opening. The vent is reconfigurable between a closed configuration, in which the vent substantially (if not entirely) prevents air flow through the at least one opening in the hood, and at least one open configuration, in which the vent allows air flow through the at least one opening in the hood. The vent includes an integrated shape memory material such that, upon actuation, the shape memory material deforms to thereby reconfigure the vent.

19 Claims, 5 Drawing Sheets

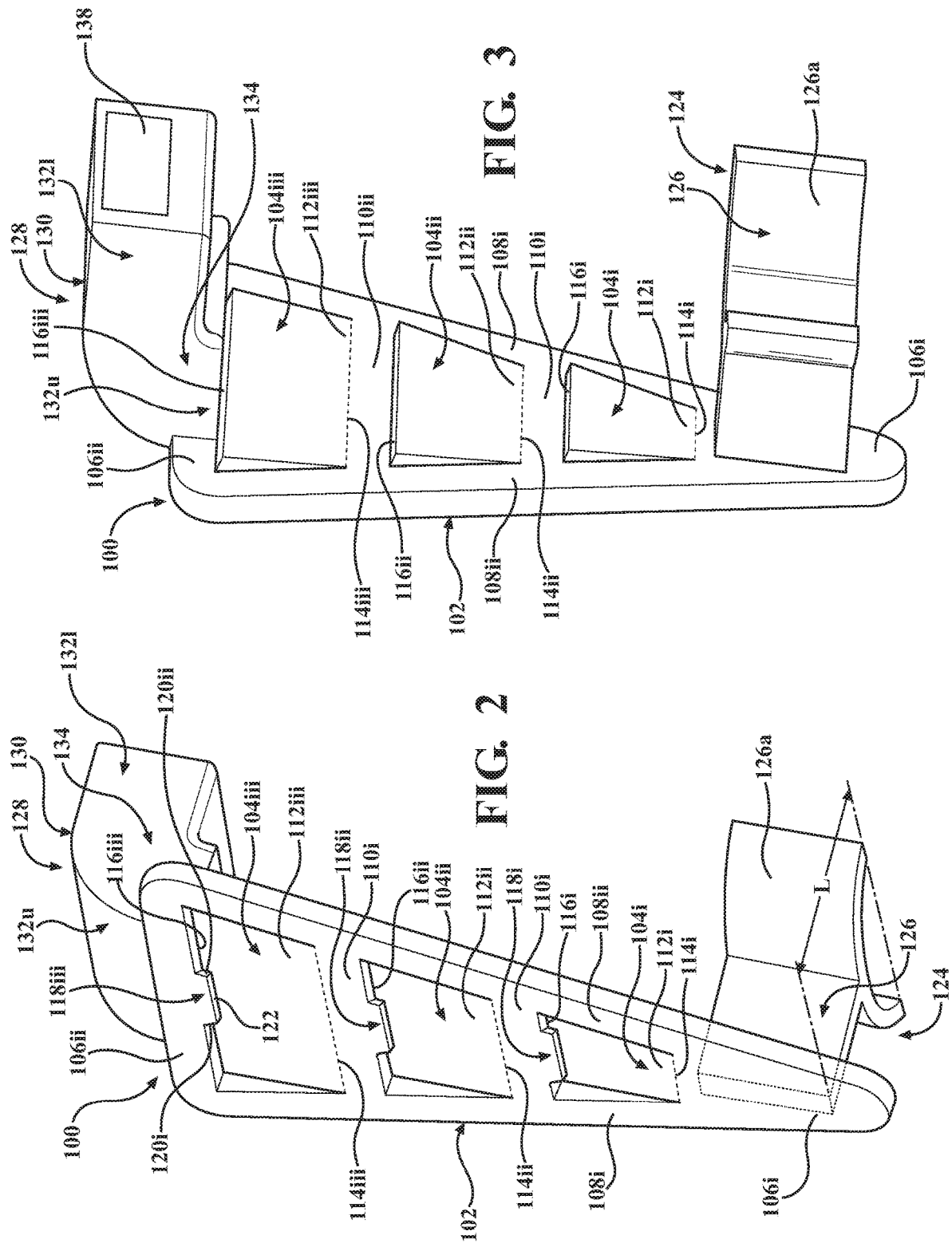

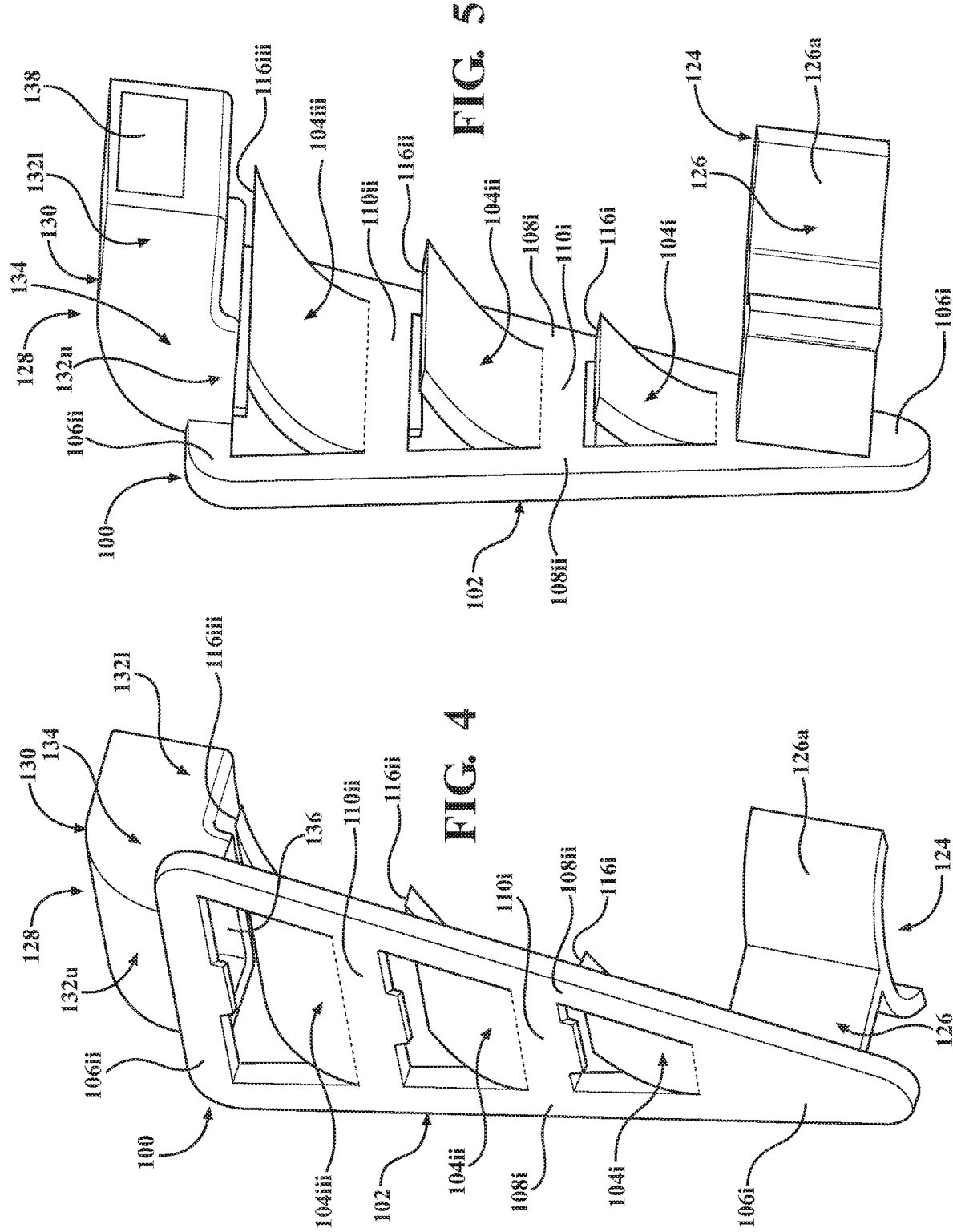

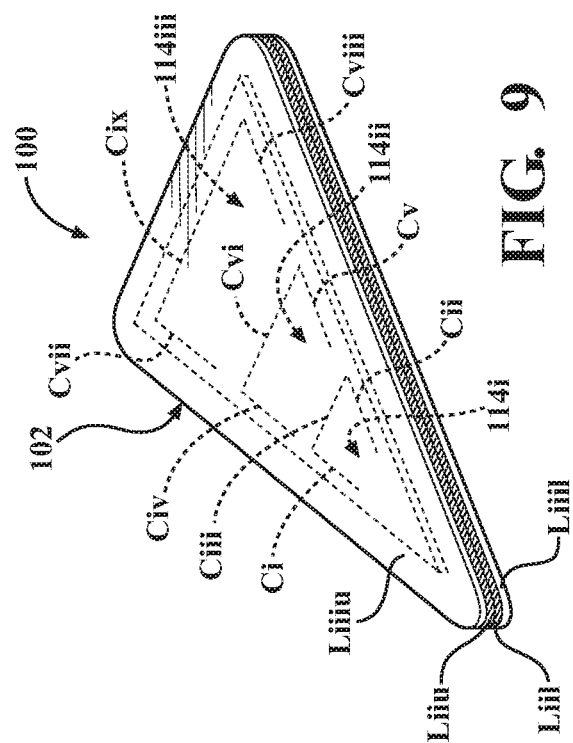
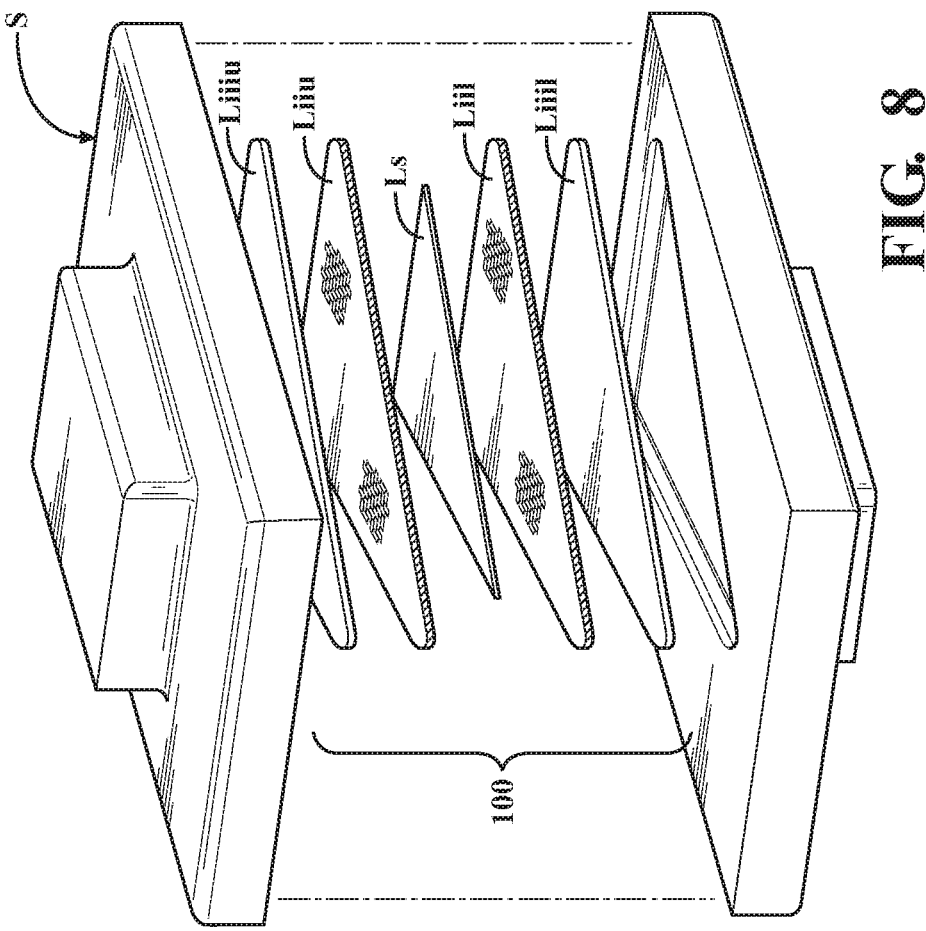

SELF-REGULATING VENTS FOR VEHICLES

TECHNICAL FIELD

The present disclosure relates to vehicles, and, more specifically, to self-regulating vents (and other such structures) that open and close automatically in response to a stimulus.

BACKGROUND

Vehicles incorporate a variety of components (e.g., vents and other such structures) that regulate, direct, or otherwise influence air flow through a number of systems, including, for example, the air intake and/or manifold for the engine, self-adjusting seats, heating and air conditioning systems, front grilles, the vehicle's trunk hatch, etc. While the majority of such components are either static, or manually adjustable, in modern vehicles, systems have been developed that allow for more automated operation. These systems, however, often require a complex actuation assembly.

The present disclosure addresses these shortcomings and improves on such components through the incorporation of shape memory materials.

SUMMARY

In one aspect of the present disclosure, a vehicle is disclosed that includes a hood defining at least one opening, and a vent that is positioned within the at least one opening. The vent is reconfigurable between a closed configuration, in which the vent substantially (if not entirely) prevents air flow through the at least one opening in the hood, and at least one open configuration, in which the vent allows air flow through the at least one opening in the hood. The vent includes an integrated shape memory material such that, upon actuation, the shape memory material deforms to thereby reconfigure the vent.

In certain embodiments, the vent may include a body, and at least one vane that is movable in relation to the body between a plurality of positions to thereby reconfigure the vent between the closed configuration and the at least one open configuration.

In certain embodiments, the shape memory material may be incorporated into to the at least one vane.

In certain embodiments the at least one vane may be connected to the body such that the at least one vane is pivotable in relation to the body.

In certain embodiments the at least one vane may include a plurality of vanes, which may be either identical or dissimilar.

In certain embodiments, the plurality of vanes may include a first vane defining a first surface area, and a second vane defining a second surface area that is different (e.g., less) than the first surface area.

In certain embodiments, the vent may further include a thermal bridge that extends from the body.

In certain embodiments, the thermal bridge may be configured to transfer heat from a heat source in the vehicle (e.g., the vehicle's engine) to the at least one vane (e.g., via direct or indirect contact with the heat source).

In certain embodiments, the shape memory material may be heat-activated.

In certain embodiments, the vent may include a thermally conductive material such that heat is transferable from the heat source in the vehicle to the at least one vane via the thermal bridge.

In certain embodiments, the vent may further include an inlet conduit that is configured to direct air flow into an engine of the vehicle.

In certain embodiments, the inlet conduit may be configured such that air is flowable across the at least one vane and into the inlet conduit when the vent is in the at least one open configuration.

In another aspect of the present disclosure a vent is disclosed that is configured for connection to a hood of a vehicle. The vent includes: a body; at least one vane that is movable in relation to the body such that the vent is reconfigurable between a first configuration, in which the vent substantially (if not entirely) prevents air flow therethrough, and a second configuration, in which the vent allows air flow therethrough; and a thermal bridge that extends from the body, and is configured to transfer heat from a heat source in the vehicle (e.g., the vehicle's engine) to the at least one vane.

In certain embodiments, the vent may include an integrated, heat-activated shape memory material such that, upon reaching a thermal threshold, the shape memory material deforms to thereby reconfigure the vent from the first configuration to the second configuration.

In certain embodiments, the vent may include a material of construction that is thermally conductive.

In certain embodiments, the shape memory material may be integrated into the material of construction of the at least one vane.

In certain embodiments, the at least one vane may be pivotable in relation to the body of the vent.

In certain embodiments, the at least one vane may include a plurality of vanes.

In certain embodiments, the vent may further include an inlet conduit that is configured to direct air flow into an engine of the vehicle.

In certain embodiments, the inlet conduit may be configured such that air is flowable across the at least one vane and into the inlet conduit when the vent is in the second configuration.

In another aspect of the present disclosure, a method is disclosed for varying airflow through an opening in a hood of a vehicle. The method includes reconfiguring a vent that is positioned within the opening in the hood via thermal activation of a shape memory material integrated into at least one vane of the vent.

In certain embodiments, reconfiguring the vent may include moving the vent between a closed configuration, in which the vent substantially (if not entirely) prevents air flow through the opening in the hood, and at least one open configuration, in which the vent allows air flow through the opening in the hood.

In certain embodiments, moving the vent between the closed configuration and the at least one open configuration includes pivoting the at least one vane in relation to a body of the vent.

BRIEF DESCRIPTION OF THE DRAWINGS

According to common practice, the various features of the drawings may not be to scale, and may be arbitrarily expanded or reduced for clarity.

FIG. 2 is a top, perspective view of the vent shown in a closed configuration.

FIG. 3 is a bottom, perspective view of the vent shown FIG. 2.

FIG. 4 is a top, perspective view of the vent shown in an open configuration.

FIG. 5 is a bottom, perspective view of the vent shown in FIG. 4.

FIG. 8 is a top, perspective view illustrating a lamination process used in fabrication of the vent.

FIG. 9 is a top, perspective view of a stamped vent body fabricated using the process seen in FIG. 8.

DETAILED DESCRIPTION

Certain vehicles include functional hood vents that allow for cooling of the vehicle's engine (via the escape of heat) and/or the introduction of cooler ambient air (e.g., into the engine compartment, the vehicle's engine, or both). Such vents are either static, and devoid of moving parts, or adjustable. Static vents, however, can create issues with turbulent flow and unnecessary drag, particularly at lower speeds, and known adjustable vents typically require manual reconfiguration, or include a complex actuation assembly that allows the vents to open and close.

The present disclosure improves upon these technologies, and describes self-regulating hood vents, which include one or more shape memory materials that allow the vents to open and close automatically. For example, in certain embodiments, vents according to the present disclosure may include an integrated, heat-activated shape memory material that allows the vents to open and close in accordance with the temperature of the vehicle's engine. As such, during normal operation at lower engine speeds, the vents remain closed (e.g., to reduce drag, inhibit the introduction of dust and/or debris into the vehicle, etc.), but open automatically at higher engine speeds as the engine temperature climbs (e.g., during race condition) when additional cooling and/or engine performance may be necessary or desirable.

Figure 1:
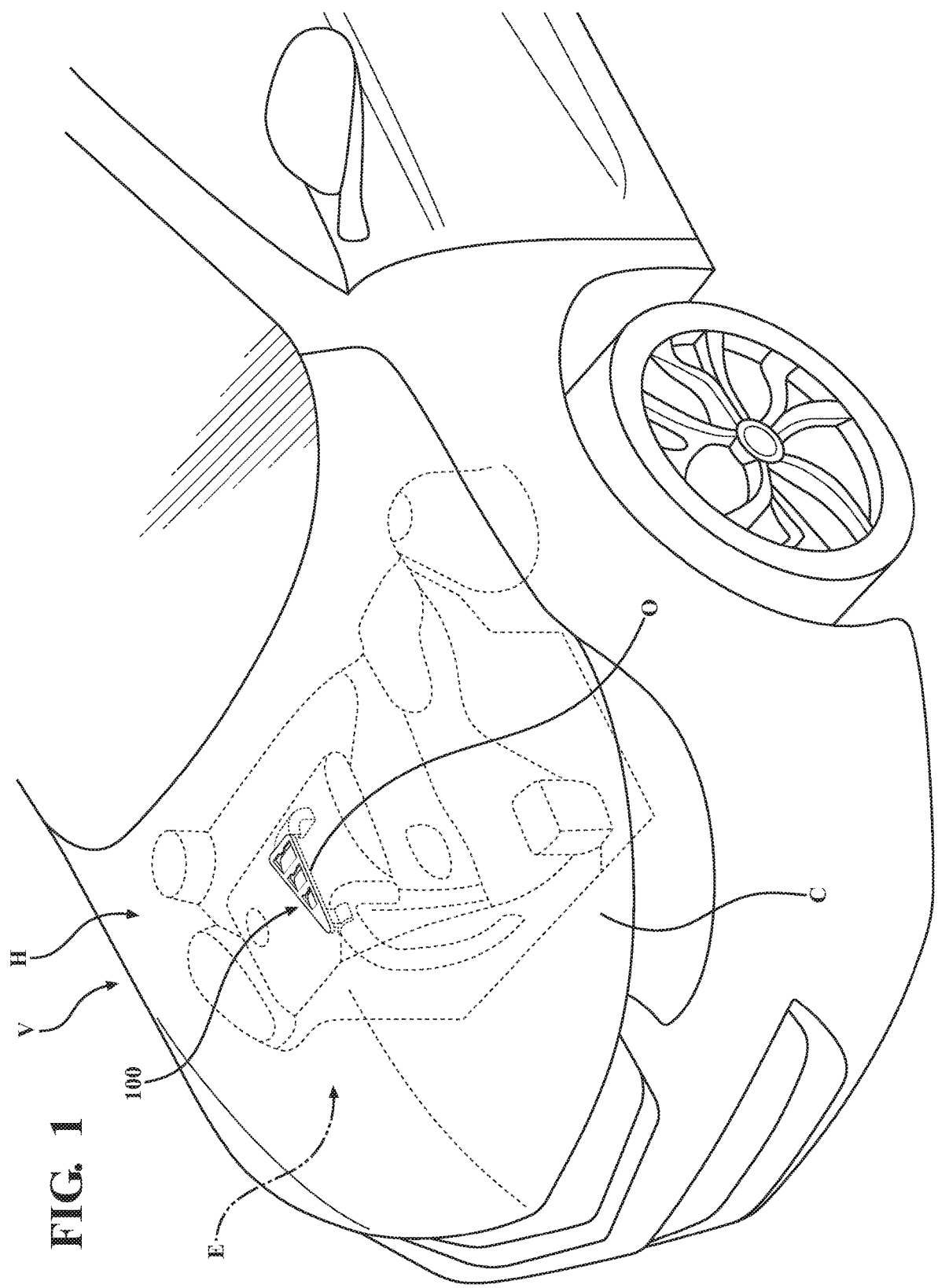
FIG. 1 is a top, perspective view of a vehicle with a hood including a vent according to the principles of the present disclosure.

With reference to FIG. 1, a vehicle V is illustrated that includes an engine E and a hood H with a vent 100 according to the principles of the present disclosure. Although shown as including a single, centralized vent 100, it should be appreciated that the particular number, size, configuration, and/or location of the vent(s) 100 may be varied in alternate embodiments of the disclosure. For example, it is envisioned that the vehicle V may include a series of vents 100 that are either identical or dissimilar in configuration. For example, it is envisioned that the hood H may include a series of vents 100 that vary in size (e.g., a larger central vent 100 that is flanked by two smaller vents 100).

The vent 100 is positioned within a corresponding opening O formed in the hood H to regulate the flow of air through the hood H and into the engine E, the engine compartment C housing the engine E, etc. The vent 100 may be secured within the opening O in any suitable manner using any suitable structure(s) and/or mechanism(s), such as, for example, an interference fit, clips, fasteners, connectors, adhesives, etc. It is thus envisioned that the hood H of the vehicle V and the vent(s) 100 may be formed as separate, discrete structures. Alternatively, however, it is envisioned that the vent(s) 100 may be integrally (e.g., monolithically) with the hood H.

With reference now to FIGS. 2-5 as well, the vent 100 includes a body 102, and one or more vanes 104. The body 102 includes a front (first) end portion 106$i$, an opposite rear (second) end portion 106$ii$, lateral portions 108$i$, 108$ii$, and one or more crossmembers 110$i$, 110$ii$ that extend between the lateral portions 108$i$, 108$ii$. Although shown as being formed integrally (e.g., monolithically) throughout the figures, in alternate embodiments of the disclosure, it is envisioned that the various components of the body 102 may be formed separately and connected to each other in any suitable manner (e.g., via the use of adhesives or mechanical connections, thermoplastic welding, etc.).

The body 102 may include (e.g., may be formed partially or entirely from) any suitable material, such as metallic materials, plastic or polymeric materials, or the like, either individually or in combination. In one particular embodiment, for example, it is envisioned that the body 102 may include (e.g., may be formed partially or entirely from) a carbon fiber-based composite material. Although shown as being generally triangular in configuration throughout the figures, and as including radiused corners, it should be appreciated that the particular geometrical configuration of the body 102 may be varied in alternate embodiments of the disclosure. For example, it is envisioned that the configuration of the body 102 may be generally rectangular, elliptical, etc.

With continued reference to FIGS. 1-5, the vane(s) 104 will be discussed. The vane(s) 104 are deflectable, deformable, or otherwise movable in relation to the body 102 between a plurality of positions to thereby reconfigure the vent 100 between an inactive (initial, or first) configuration (FIGS. 2, 3), in which the vent 100 is closed, and one or more active (subsequent, or second) configurations (FIGS. 4, 5), in which the vent 100 is open to varying degrees (e.g., partially or fully open). More specifically, in the illustrated embodiment, as seen in FIG. 2, the vent 100 includes a first vane 104$i$ with a first (front) end 112$i$ (FIG. 2) that is pivotably connected to the front end portion 106$i$ of the body 102 (e.g., at a first living hinge 114$i$), and a free rear (second) end 116$i$, a second vane 104$ii$ with a first (front) end 112$ii$ that is pivotably connected to the crossmember 110$i$ (e.g., at a second living hinge 114$ii$), and a free rear (second) end 116$ii$, and a third vane 104$iii$ with a first (front) end 112$iii$ that is pivotably connected to the crossmember 110$ii$ (e.g. at a third living hinge 114$iii$), and a free rear (second) end 116$iii$.

Figure 6:
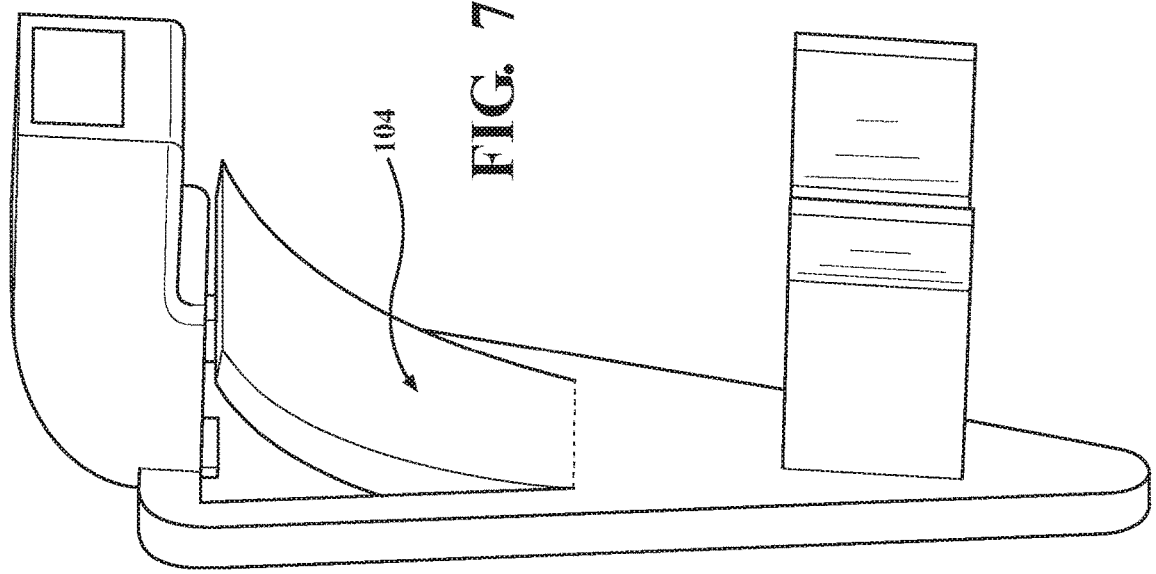
FIG. 6 is a top, perspective view of an alternate embodiment of the vent including a single vane shown in an open configuration.
Figure 7:
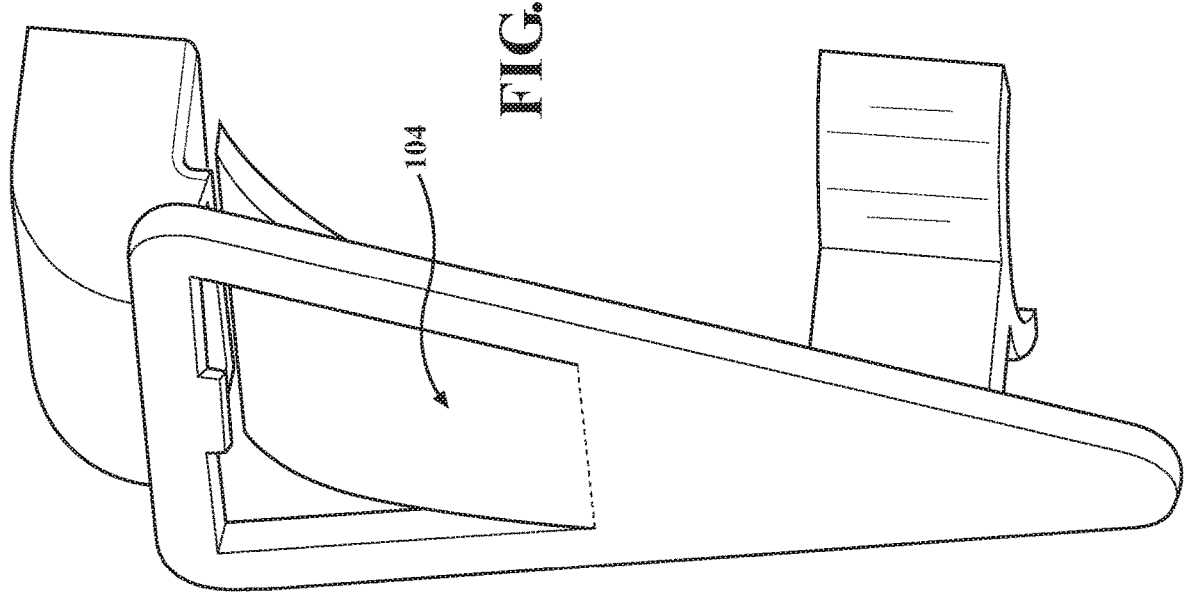
FIG. 7 is a bottom, perspective view of the vent shown in FIG. 6.

Although shown as including three vanes 104$i$, 104$ii$, 104$iii$ in FIGS. 1-5, in various embodiments of the disclosure, it is envisioned that the number of vanes 104 may be varied. For example, an embodiment including a single vane 104 is also contemplated herein, as seen in FIGS. 6 and 7.

Additionally, while the vanes 104 are shown as being dissimilar in FIGS. 1-5 (e.g., as including surface areas that increase progressively from the vane 104$i$ to the vane 104$iii$), in alternate embodiments of the disclosure, it is envisioned that the vanes 104 may be identical.

Although shown as being integrally (e.g., monolithically) formed with the body 102 of the vent 100 throughout the figures, in alternate embodiments of the disclosure, it is envisioned that the body 102 of the vent 100 and the vane(s) 104 may be formed as separate, discrete structures that are connected via pivot members (not shown), such as pins, dowels, rods, or the like.

When the vent 100 is in the inactive (closed) configuration (FIGS. 2, 3), the vane(s) 104 extend in parallel (or generally parallel) relation to the body 102 so as to substantially (if not entirely) prevent the flow of air through the vent 100, and, thus, the corresponding opening O (FIG. 1) in the hood H. Although shown as being positioned slightly below the plane defined by the body 102 in the embodiment of the disclosure seen in FIGS. 1-5, in alternate embodiments, it is envisioned that the free rear (second) end 116 of each vane 104 may be positioned in coplanar (or generally coplanar) relation with the body 102, as discussed in further detail below.

In the active (open) configuration (FIGS. 4, 5), however, the vane(s) 104 are angled in relation to the body 102. More specifically, when the vent(s) 100 are in the active (open) configuration, the free rear (second) end 116 of each vane 104 is positioned below the body 102 (i.e., closer to engine E (FIG. 1) of the vehicle V) to thereby allow for the flow of air through the vent 100, and, thus, the corresponding opening O in the hood H.

Although each of the vanes 104 is shown as assuming an arcuate (curved) configuration when the vent 100 is in the active (open) configuration, in alternate embodiments, it is envisioned that the vanes 104 may remain generally planar (linear) in configuration as the vent 100 transitions into the active (open) configuration, as discussed in further detail below.

Additionally, although each of the vanes 104 is shown as being configured to direct air flow towards the rear end portion 106ii of the body 102 throughout the figures, in alternate embodiments of the disclosure, it is envisioned that the configuration of the vanes 104 may be varied so as to direct air flow as necessary or desired. For example, it is envisioned that one or more of the vanes 104 may be configured to direct air flow towards the front end portion 106i of the body 102, or that one or more of the vanes 104 may be configured to direct air flow towards the lateral portion 108i and/or the lateral portion 108ii of the body 102.

To facilitate reconfiguration of the vent(s) 100 between the inactive (closed) configuration (FIGS. 2, 3) and the active (open) configuration (FIGS. 4, 5), the vane(s) 104 include one or more deformable (reconfigurable) shape memory materials that are integrated into (e.g., embedded within) the material of construction for each vane 104 (i.e., such that the shape memory material(s) are internal to the vane(s) 104), as described in further detail below. It is envisioned that any suitable shape memory material(s) may be utilized, including thermoplastic and thermoset (covalently cross-linked) polymeric materials, examples of which include, but are not limited to, polylactic acid, acrylonitrile butadiene styrene, polyamides, polycarbonate, polyester, polyurethanes, epoxy, polyimide, thermo-responsive hydrogels, etc.

Upon exposure to a sufficient stimulus, such as heat, the shape memory material(s) are activated, whereupon the shape memory material(s) deform in a predetermined fashion to cause corresponding deflection, deformation, or other such movement of the vane(s) 104 in relation to the body 102 of the vent 100 (e.g., towards the engine E (FIG. 1)). In the particular embodiment shown throughout the figures, for example, the shape memory material(s) are adapted for activation upon reaching temperatures that lie substantially within the range of approximately 80° C. to approximately 200° C. (as a result of the heat generated by the engine E during operation of the vehicle V, for example). It should be appreciated, however, that activation of the shape memory material(s) upon exposure to temperatures outside of this range would not be beyond the scope of the present disclosure.

Vents 100 according to the present disclosure are, thus, self-regulating in that the vents 100 reconfigure (i.e., open and close) automatically via movement of the vane(s) 104 in accordance with temperature variation, thereby eliminating the need for either manual manipulation, or separate actuators, pneumatic systems, and the like. For example, during normal operation of the vehicle V (e.g., at lower engine speeds and, thus, lower temperatures), the shape memory material(s) remain inactive, and the vent(s) 100 are allowed to remain closed, which reduces turbulent flow and drag on the vehicle V. However, at elevated engine speeds (e.g., during race conditions), as the temperature of the engine E (and/or the engine compartment C) rises, upon reaching a predetermined thermal threshold (temperature), the shape memory material(s) are activated, and the vent(s) 100 open gradually and automatically via movement of the vane(s) 104 (e.g., towards the engine E (FIG. 1)), which not only allows heat to escape, but forces cooler ambient air into the engine compartment C and/or the engine E, resulting in more efficient cooling of the engine E and/or increased efficiency of the engine E (e.g., on the order of 5% or more). As the engine E cools (e.g., as normal operation of the vehicle V resumes, after the vehicle V has been shut down, etc.), however, the shape memory material deactivates, and the vent(s) 100 gradually and automatically return to the inactive (closed) configuration via movement vane(s) 104 (e.g., away from the engine E (FIG. 1)).

While the vent(s) 100 are described herein as including the aforementioned heat-activated shape memory material throughout the present disclosure, it should be appreciated that the particular nature and characteristics of the shape memory material(s) may be varied in alternate embodiments without departing from the scope of the present disclosure. For example, while heat-activated shape memory material(s) are generally simpler to implement, and more cost effective, it is envisioned that the vent(s) 100 may include shape memory material(s) that are activated upon exposure to humidity, to an electrical current, to a magnetic field, to light, or to any other suitable stimulus. In the context of electro-active shape-memory materials, carbon nanotubes, carbon fibers, carbon black, metallic materials, etc., are impregnated into the shape memory polymer(s) for activation by an electrical current, which may reduce the response time when compared to heat-activated polymers. In the context of magneto-active shape memory materials, ferromagnetic or paramagnetic materials are impregnated into the shape memory polymer(s) for activation by a magnetic field, which allows for remote activation. In the context of photoactive shape memory materials, photo-crosslinking and/or photo-cleaving is used to change the glass transition temperature of the shape memory polymer(s) such that, upon exposure to light having a specific wavelength (e.g., UV light), the cross-linking density of the shape memory polymer(s) is varied to thereby cause activation without significant temperature change.

In certain embodiments, it is envisioned that the stimulus may be communicated from (and/or controlled by) an external control unit (not shown) to facilitate added control over the specific configuration of the vent(s) 100. For example, when necessary or desirable, the degree to which the vent(s) 100 are open may be increased or decreased by varying the magnitude of the stimulus.

To prevent the vane(s) 104 from extending beyond (above) the body 102 when the vent 100 is in the inactive (closed) configuration, the body 102 may include one or more stops 118 (FIG. 2). More specifically, in the illustrated embodiment, the crossmember 110i includes a first stop 118i that is configured for engagement with the free rear (second) end 116i of the vane 104i, the crossmember 110ii includes a second stop 118*ii* that is configured for engagement with the free rear (second) end 116*ii* of the vane 104*ii*, and the rear end portion 106*ii* of the body 102 includes a third stop 118*iii* that is configured for engagement with the free rear (second) end 116*iii* of the vane 104*iii*.

Although each of the stops 118 is illustrated as being generally polygonal in configuration throughout the figures (e.g., as including a pair of generally linear sidewalls 120*i*, 120*ii* (FIG. 2) that are connected by a generally linear end wall 122), it should be appreciated that the particular configuration of the stop(s) 118 may be varied in alternate embodiments without departing from the scope of the present disclosure. For example, embodiments in which the vent 100 includes one or more stops 118 that are generally arcuate in configuration are also contemplate herein, as are embodiments in which one or more of the stops 118 is configured in accordance with a logo (or other such identifying mark) associated with the vehicle V.

Additionally, although each of the stops 118 is illustrated as being integrally (e.g., monolithically) formed with the body 102 of the vent 100 throughout the figures, in alternate embodiments of the disclosure, it is envisioned that the body 102 and the stops 118 may be formed as separate, discrete structures that can be connected to each other in any suitable manner (e.g., via clips, fasteners, connectors, adhesives, thermoplastic welding, etc.).

As seen in FIG. 2, for example, to restrict movement of the vane(s) 104 outwardly (i.e., away from the engine E (FIG. 1)), the stops 118 are configured for contact with the free rear (second) ends 116 of each vane 104, which results in positioning of the free rear (second) ends 116 slightly below the plane defined by the body 102, as mentioned above. In those embodiments of the disclosure that are devoid of the stops 118, however, it should be appreciated that the free rear (second) end 116 of each vane 104 may be positioned in coplanar (or generally coplanar) relation with the body 102 when the vent(s) 100 are in the inactive (closed) configuration.

It is envisioned that vent(s) 100 according to the present disclosure may be manufactured using a variety of processes including, for example, multi-material 3-D printing, multi-material liquid 3-D printing, fused deposition modeling, and, in particular, roll-to-roll lamination and stamping, as illustrated in FIGS. 8 and 9, which may find particular applicability in high volume production. In the roll-to-roll lamination and stamping process, a series of layers of materials are secured together via lamination to create a sheet of composite material, from which, the vent 100 if formed via stamping and cutting. In the embodiment of the disclosure seen in FIGS. 8 and 9, for example, five layers L of material are arranged in a stacked configuration such that a layer Ls of the aforedescribed shape memory material (i.e., a first material) is positioned between respective upper and lower layers Liiu, Liil of a structural (second) material (e.g., carbon fiber), which is positioned between respective upper and lower layers Liiiu, Liiil of a coating (third) material (e.g., to create a smooth, polishable overlay for the purpose of aesthetics and/or protection from the elements). Although shown as including five layers L of material in the illustrated embodiment, it should be appreciated that the particular number of layers L may be varied in alternate embodiments without departing from the scope of the present disclosure.

Following lamination, a stamp S is utilized to form the body 102 of each vent 100 from the sheet of composite material, as shown in FIG. 8. A series of cuts Ci-Cix can then be made in the body 102 to thereby define the vane(s) 104*i*-104*iii* (in the illustrated embodiment), and form the living hinge(s) 114*i*-114*iii* (FIG. 2).

In those embodiments of the disclosure in which carbon fiber is incorporated into the structural layers Liiu, Liil, the configuration of the vane(s) 104 realized upon activation of the shape memory material(s) can be varied and/or customized to achieve any desirable effect. For example, the orientation of the carbon fiber threads may be varied to thereby alter the deflection profile of the vane(s) 104 (i.e., the manner in which the vane(s) 104 deflect, deform, or otherwise move upon activation of the shape memory material(s)) and/or the configuration of the vane(s) 104 when the vent 100 is in the activate (open) configuration, to achieve any desired result.

Although the shape memory material(s) are illustrated as being distributed across the entire cross-sectional area of the vane(s) 104 in the embodiment of the disclosure seen in FIGS. 8 and 9, it should be appreciated that, in alternate embodiments, the shape memory material(s) may only be distributed across a portion of the cross-sectional area of the vane(s) 104. For example, the shape memory material(s) may only be included at those portions of the vane(s) 104 that extend from (are in contact with) they body 102 (e.g., at, or adjacent to, the living hinge(s) 114 (FIG. 2)). By varying the distribution of shape memory material(s) across the cross-sectional area of the vane(s) 104, it is envisioned that the deflection profile of the vane(s) 104 may be further customized to achieve any desired result. For example, when distributed across the entire cross-sectional area of the vane(s) 104, the vane(s) 104 may assume a more arcuate (curved) configuration upon activation of the shape memory material(s), as seen in FIGS. 4 and 5, whereas distributing the shape memory material(s) across only a portion of the cross-sectional area of the vane(s) 104 may allow the vane(s) 104 to generally retain a more linear configuration upon activation of the shape memory material(s).

It is further envisioned that the particular configuration of the vane(s) 104 assumed upon activation of the shape memory material(s) may also be altered by varying the specific location of the shape memory material(s) with respect to the cross-sectional area of the vane(s) 104. For example, it is envisioned that the vane(s) 104 may only experience deflection at (or adjacent to) the lateral edges and/or the free rear (second) ends 116 thereof via the incorporation of the shape memory material(s) exclusively in those areas.

Although the layers L are each shown as being uniform (or generally uniform) and equivalent (or generally equivalent) in thickness in the embodiment of the disclosure seen in FIGS. 8 and 9, in alternate embodiments, it is envisioned that the thickness of one or more of the layers L may be varied to alter the functionality of the vent(s) 100. For example, by varying the thickness of the layer Ls of shape memory material(s) (and/or the uniformity in the thickness of the layer Ls), the thermal threshold at which the shape memory material(s) are activated can be altered to suit any application.

In certain embodiments of the disclosure, it is envisioned that the layer Ls of shape memory material(s) may be formed via 3-D printing. 3-D printing may allow for added flexibility during fabrication by permitting a variety of shape memory materials to be combined and specifically positioned in any desired location across the cross-sectional area of the vane(s) 104 so as to create a more customizable effect upon activation (e.g., deformation in accordance with a particular deflection profile).

With reference again to FIGS. 1-5, in certain embodiments, the vent 100 may further include a thermal bridge 124 that extends from the body 102. The thermal bridge 124 is configured to facilitate the transfer of heat from a heat source in the vehicle V (e.g., the engine E, a supercharger, a turbocharger, a component of the vehicle V's exhaust system, etc.) to the vane(s) 104 (e.g., via thermal communication through the body 102). In the particular embodiment of the vent 100 seen in FIGS. 1-5, for example, the thermal bridge 124 is configured as an arm 126 including an engagement section 126a that is configured for (direct or indirect) contact with the engine E. It should be appreciated, however, that the particular configuration of the thermal bridge 124 may be varied in alternate embodiments of the disclosure depending upon spatial requirements, desired performance of the vent(s) 100, etc. For example, although shown as being generally arcuate in configuration throughout the figures, in alternate embodiments, the engagement section 126a may be generally linear in configuration, may include (or define) a plurality of fingers, or may be configured in any other manner suitable for the intended purpose of transferring heat to the vane(s) 104. Additionally, in place of the arm 126, it is envisioned instead that the thermal bridge 124 may include (or may be configured as) a wire, strap, or other such flexible member (e.g., to allow for additional roll, or other such movement of the engine E, during operation of the vehicle V).

The thermal bridge 124 may include any material suitable for the intended purpose of transferring heat from the heat source in the vehicle V (e.g., the engine E) to the vane(s) 104, which may be either the same material(s) used in construction of the body 102 and/or the vane(s) 104, or different materials. For example, in one particular embodiment, it is envisioned that the body 102 of the vent 100 and the thermal bridge 124 may each be formed from carbon fiber (or other such suitable thermally conductive material).

In the particular embodiment of the disclosure seen in FIGS. 1-5, the arm 126 defines a length L (FIG. 2), the dimensions of which may be varied as required to facilitate use of the vent(s) 100 with a variety of vehicles V. Although shown as extending from (e.g., as being connected to) the front (first) end portion 106i of the body 102, it is envisioned that the particular location and/or orientation of the thermal bridge 124 may be varied in alternate embodiments of the disclosure to further facilitate use with a variety of vehicles V.

Although the arm 126 is illustrated as having a fixed, rigid configuration in the embodiment of the vent 100 seen in FIGS. 1-5, in alternate embodiments of the disclosure, it is envisioned that the configuration of the arm 126 may be variable. For example, in certain embodiments, it is envisioned that the arm 126 may include (e.g., may be formed partially or entirely from) the aforedescribed shape memory material(s) such that, upon activation of the shape memory material(s), the arm 126 may reconfigured from a first configuration, in which the arm 126 is separated from the heat source in the vehicle V (e.g., the engine E), to a second configuration, in which the arm 126 is in contact with the heat source in the vehicle V (e.g., the engine E) to augment heat transfer to the vane(s) 104, and, thus, reconfiguration of the vent 100 in the manner described above.

Additionally, although the arm 126 is illustrated as being integrally (e.g., monolithically) formed with the body 102 of the vent 100 in the embodiment seen in FIGS. 1-5, in alternate embodiments of the disclosure, it is envisioned that the body 102 and the arm 126 may be formed as separate, discrete structures that can be connected to each other in any suitable manner (e.g., via clips, fasteners, connectors, adhesives, thermoplastic welding, etc.).

In those embodiments of the disclosure that are devoid of the thermal bridge 124, to account for slower or reduced heat transfer to the vane(s) 104, it is envisioned that the thermal threshold of the shape memory material(s) integrated into the vane(s) 104 (i.e., the temperature at which the shape memory material(s) are activated) may be less than the thermal threshold in those embodiments of the disclosure that include the thermal bridge 124.

With continued reference to FIGS. 1-5, in certain embodiments, the vent(s) 100 may include an inlet conduit 128, either in addition to (or instead of) the thermal bridge 124, that is configured to receive and direct air flow from the vane(s) 104. Although shown and described herein as being configured to direct air flow into the engine E of the vehicle V (e.g., into the engine E's intake manifold), it should be appreciated that the particular configuration and/or location of inlet conduit 128 (e.g., with respect to the body 102 of the vent 100) may be varied in alternate embodiments to direct air flow in any suitable manner and/or into any suitable component (e.g., the vehicle V's heating and air conditioning system).

The inlet conduit 128 includes a body portion 130 having an upper section 132u, and a lower section 132l that extends transversely from the upper section 132u so as to define an elbow 134. Although the elbow 134 is shown as defining an angle of approximately 90°, it should be appreciated that the configuration of the elbow 134 may be varied in alternate embodiments of the disclosure so as to define any suitable angle and direct the flow of air as necessary (e.g., depending upon the particular location and/or configuration of the engine E, the intake manifold, etc.). Additionally, embodiments of the disclosure are envisioned in which the elbow 134 may be eliminated such that the inlet conduit 128 includes a generally linear configuration.

The upper section 132u defines an ingress 136 (FIG. 4), and the lower section 132l defines an egress 138 (FIGS. 3, 5). Although shown as being generally open and unobstructed, in certain embodiments, it is envisioned that the ingress 136 and/or the egress 138 may include a barrier, filter, or other such component (e.g., to inhibit the introduction of dust and/or debris into the engine E).

Although the inlet conduit 128 is illustrated as being integrally (e.g., monolithically) formed with the body 102 of the vent 100 in the embodiment seen in FIGS. 1-5, in alternate embodiments of the disclosure, it is envisioned that the body 102 and the inlet conduit 128 may be formed as separate, discrete structures that can be connected to each other in any suitable manner (e.g., via clips, fasteners, connectors, adhesives, thermoplastic welding, etc.).

With continued reference to FIGS. 1-5, when the vent 100 is in the inactive (closed) configuration, air flows across the body 102 and the vane(s) 104, generally following the contour of the vent(s) 100 and the hood H, and, thus, generally avoiding the inlet conduit 128. Upon activation of the shape memory material(s), however, as the vane(s) 104 deflect (or otherwise move) in relation to the body 102 of the vent 100, air flows across the vane(s) 104, and is directed into the ingress 136 defined by the upper section 132u of the inlet conduit 128. Air then flows through the body portion 130, and exits the egress 138 defined by the lower section 132l, thereafter entering the engine compartment C (FIG. 1), the engine E, the vehicle V's heating and air conditioning system, etc.

While the elements and features described herein are generally discussed in the context of the aforementioned hood vent, it should be appreciated that the shape memory materials, components, and methodologies described herein may be applied to a variety of vehicular components in alternate implementations of the present disclosure including, for example, trunk hatch vents, self-adjusting seats, heating and/or air conditioning vents, air intakes and/or manifolds, front grilles, etc.

Persons skilled in the art will understand that the various embodiments of the disclosure described herein and shown in the accompanying figures constitute non-limiting examples, and that additional components and features may be added to any of the embodiments discussed herein without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms, such as "comprises," "includes," and "having," should be understood to provide support for narrower terms, such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A vehicle, comprising:
   a hood defining at least one opening; and
   a vent positioned within the at least one opening, the vent including at least one movable vane such that the vent is reconfigurable between a closed configuration, in which the at least one vane substantially prevents air flow through the at least one opening in the hood, and at least one open configuration, in which the at least one vane allows air flow through the at least one opening in the hood, the vent including a shape memory material integrated into the at least one vane such that, upon actuation, the shape memory material deforms to thereby move the at least one vane and reconfigure the vent.

2. The vehicle of claim 1, wherein the vent further includes:
   a body,
   the at least one vane being movable in relation to the body between a plurality of positions to thereby reconfigure the vent between the closed configuration and the at least one open configuration.

3. The vehicle of claim 2, wherein the at least one vane is connected to the body such that the at least one vane is pivotable in relation to the body.

4. The vehicle of claim 1, wherein the at least one vane includes a plurality of vanes.

5. The vehicle of claim 4, wherein the plurality of vanes are dissimilar.

6. The vehicle of claim 5, wherein the plurality of vanes includes a first vane defining a first surface area and a second vane defining a second surface area, the second surface area being less than the first surface area.

7. The vehicle of claim 2, wherein the vent further includes:
   a thermal bridge extending from the body, the thermal bridge being configured to transfer heat from a heat source in the vehicle to the at least one vane.

8. The vehicle of claim 7, wherein the shape memory material is heat-activated, the vent including a thermally conductive material such that heat is transferable from the heat source in the vehicle to the at least one vane via the thermal bridge.

9. The vehicle of claim 1, wherein the vent further includes:
   an inlet conduit configured to direct air flow into an engine of the vehicle.

10. The vehicle of claim 9, wherein the inlet conduit is configured such that air is flowable across the at least one vane and into the inlet conduit when the vent is in the at least one open configuration.

11. A vent configured for connection to a hood of a vehicle, the vent comprising:
    a body;
    at least one vane movable in relation to the body such that the vent is reconfigurable between a first configuration, in which the vent substantially prevents air flow therethrough, and a second configuration, in which the vent allows air flow therethrough; and
    a thermal bridge extending from the body, the thermal bridge being configured to transfer heat from a heat source in the vehicle to the at least one vane.

12. The vent of claim 11, wherein the vent includes an integrated, heat-activated shape memory material such that, upon reaching a thermal threshold, the shape memory material deforms to thereby reconfigure the vent from the first configuration to the second configuration.

13. The vent of claim 12, wherein the vent includes a material of construction that is thermally conductive, the shape memory material being integrated into the material of construction of the at least one vane.

14. The vehicle of claim 13, wherein the at least one vane is pivotable in relation to the body.

15. The vehicle of claim 14, wherein the at least one vane includes a plurality of vanes.

16. The vehicle of claim 13, wherein the vent further includes:
- an inlet conduit configured to direct air flow into an engine of the vehicle, the inlet conduit being configured such that air is flowable across the at least one vane and into the inlet conduit when the vent is in the second configuration.

17. A method of varying airflow through an opening in a hood of a vehicle, the method comprising:
- reconfiguring a vent positioned within the opening in the hood via thermal activation of a shape memory material integrated into at least one vane of the vent.

18. The method of claim 17, wherein reconfiguring the vent includes moving the vent between a closed configuration, in which the vent substantially prevents air flow through the opening in the hood, and at least one open configuration, in which the vent allows air flow through the opening in the hood.

19. The method of claim 18, wherein moving the vent between the closed configuration and the at least one open configuration includes pivoting the at least one vane in relation to a body of the vent.

\* \* \* \* \*